(12) United States Patent
Bierwirth et al.

(10) Patent No.: US 7,240,916 B2
(45) Date of Patent: Jul. 10, 2007

(54) GAS GENERATOR

(75) Inventors: Sebastian Bierwirth, Rechtmehring (DE); Achim Hofmann, Polling (DE); Karsten Schwuchow, Wasserburg (DE)

(73) Assignee: TRW Airbag Systems GmbH, Aschau/Inn (DE)

( * ) Notice: Subject to any disclaimer, the term of this patent is extended or adjusted under 35 U.S.C. 154(b) by 559 days.

(21) Appl. No.: 10/736,254

(22) Filed: Dec. 15, 2003

(65) Prior Publication Data

US 2004/0126290 A1    Jul. 1, 2004

(30) Foreign Application Priority Data

Dec. 23, 2002  (DE) ................... 202 19 898 U

(51) Int. Cl.
*B60R 21/26* (2006.01)

(52) U.S. Cl. ...................... 280/736; 102/530

(58) Field of Classification Search ............... 102/530; 422/305; 280/741
See application file for complete search history.

(56) References Cited

U.S. PATENT DOCUMENTS

| 4,886,293 A | | 12/1989 | Weiler et al. | |
|---|---|---|---|---|
| 4,950,458 A | * | 8/1990 | Cunningham | ............... 422/164 |
| 5,116,080 A | | 5/1992 | Wipasuramonton | |
| 5,433,475 A | * | 7/1995 | Kokeguchi | ................. 280/736 |
| 5,454,593 A | * | 10/1995 | Armstrong et al. | ......... 280/741 |
| 5,487,561 A | * | 1/1996 | Mandzy et al. | ............. 280/741 |
| 5,556,130 A | * | 9/1996 | Fulmer | ....................... 280/741 |
| 5,593,181 A | * | 1/1997 | Walker et al. | ............... 280/741 |
| 5,623,115 A | * | 4/1997 | Lauritzen et al. | ........... 102/288 |
| 5,762,369 A | * | 6/1998 | Mooney et al. | ............. 280/741 |
| 5,851,030 A | * | 12/1998 | Johnson et al. | ............. 280/741 |
| 5,951,041 A | * | 9/1999 | Iwai et al. | ................... 280/737 |
| 6,314,888 B1 | * | 11/2001 | Muller et al. | ................ 102/530 |
| 6,557,888 B1 | * | 5/2003 | Nakashima et al. | ........ 280/735 |
| 6,851,374 B1 | * | 2/2005 | Kelley et al. | ................ 102/530 |
| 6,948,737 B2 | * | 9/2005 | Ohji et al. | ................... 280/736 |
| 2003/0160437 A1 | * | 8/2003 | Ohji et al. | ................... 280/736 |
| 2004/0075258 A1 | * | 4/2004 | Kubo et al. | ................. 280/735 |
| 2004/0244632 A1 | * | 12/2004 | Matsuda | ..................... 102/530 |

FOREIGN PATENT DOCUMENTS

| DE | 3831641 | 2/1990 |
|---|---|---|
| EP | 0578478 | 1/1994 |
| EP | 1136330 | 9/2001 |

\* cited by examiner

*Primary Examiner*—Troy Chambers
(74) *Attorney, Agent, or Firm*—Tarolli, Sundheim, Covell & Tummino LLP

(57) ABSTRACT

A gas generator includes a housing, which has outflow openings for outflowing gas, and at least one destructible insulation foil which in a non-activated state of the gas generator closes at least one of the outflow opening so as to be moisture-tight. The insulation foil has a varying thickness. The varying thickness is provided by at least one thermally insulating foil layer with a varying thickness, which lies over a base layer.

12 Claims, 4 Drawing Sheets

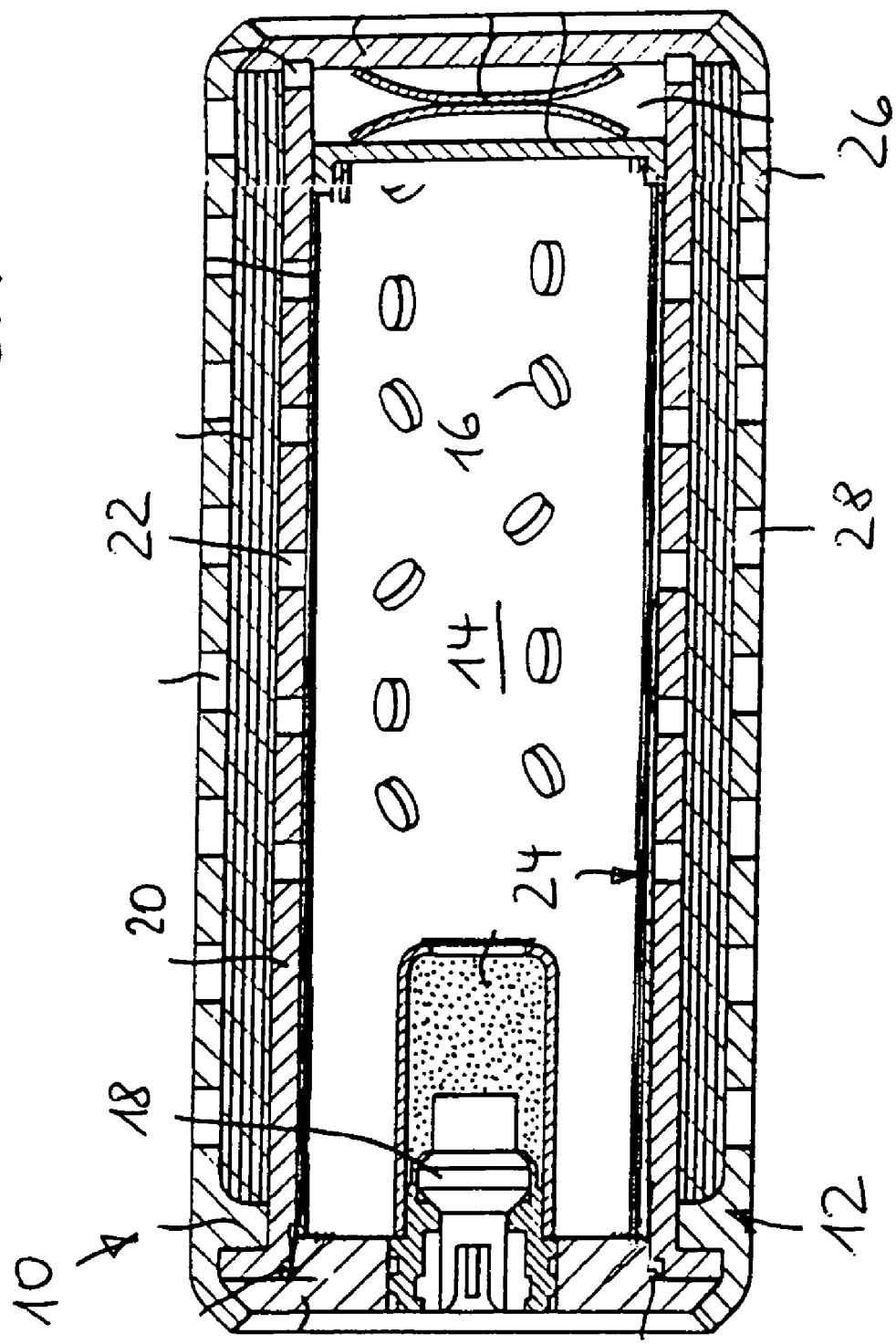

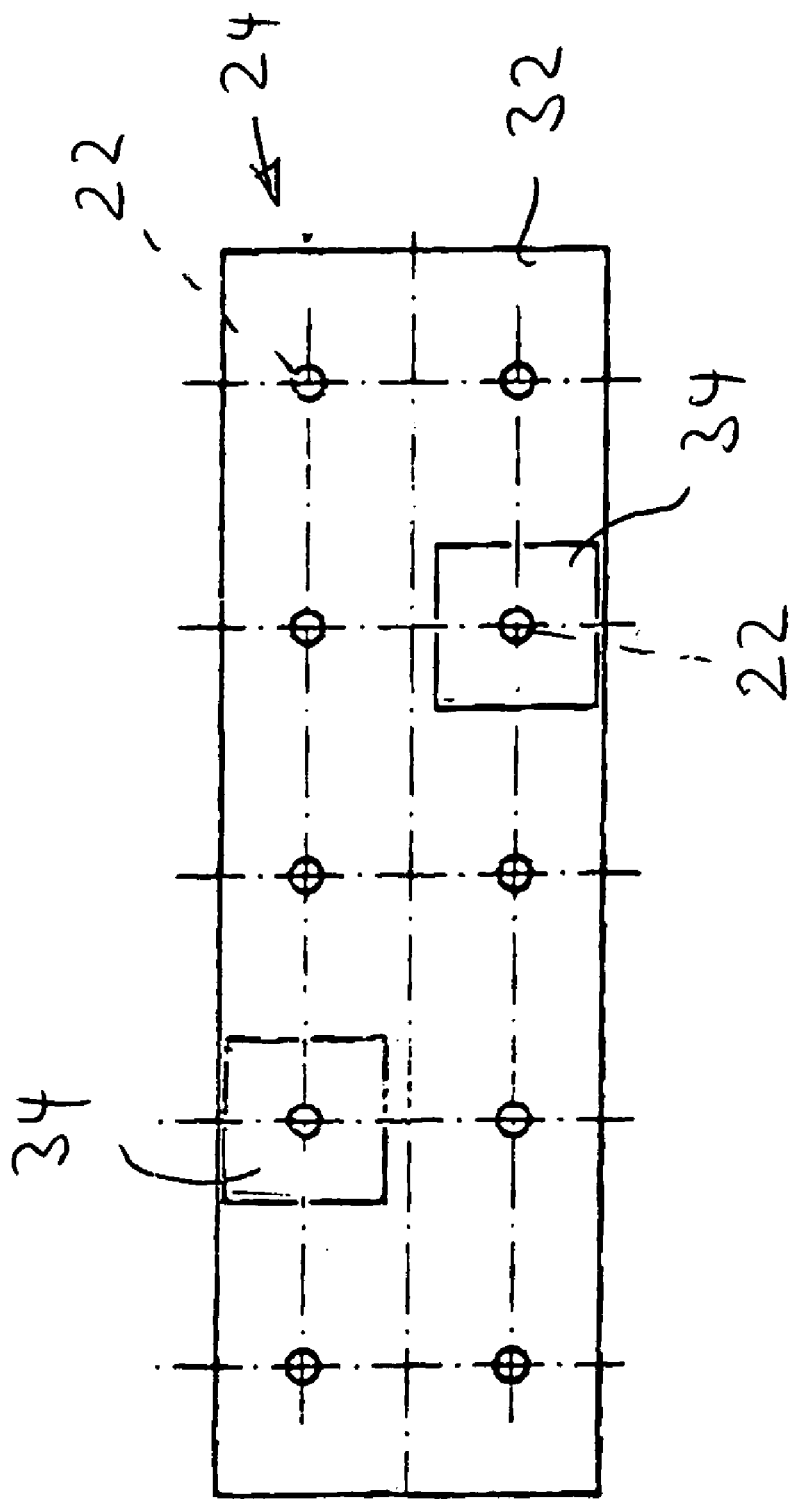

GAS GENERATOR

TECHNICAL FIELD

The invention relates to a gas generator with a housing which has outflow openings for outflowing gas.

BACKGROUND OF THE INVENTION

A gas generator of this type normally has, in addition, at least one destructible insulation foil which in the non-activated state of the gas generator closes at least one of the outflow openings so as to be moisture-tight, the insulation foil having a varying thickness.

A generic gas generator is known from DE 38 31 641 A1. The insulation foil closes off the outflow openings over a period of years, so as not to allow any moisture to reach the solid propellant. By insulation foil of varying thickness, the resistance of the insulation foil on opening can be adjusted and thereby the pressure inside the gas generator in the initial phase of combustion can be varied. The burning behavior is altered hereby. At high ambient temperatures of over 75° C. up to 90° C., propellant burns substantially faster than at low ambient temperatures of, for example, below −25° C. In order to keep the burning speed more constant over the entire temperature range of −40° C. to 90° C., it is intended to keep some outflow openings closed at lower temperatures and thereby to increase the pressure inside the gas generator.

The invention provides a gas generator by which the fluctuations of the combustion chamber pressure in the above-mentioned temperature range are reduced.

BRIEF SUMMARY OF THE INVENTION

According to the invention, this is achieved in a gas generator with a housing, which has outflow openings for outflowing gas, and at least one destructible insulation foil which in a non-activated state of the gas generator closes at least one of the outflow opening so as to be moisture-tight. The insulation foil has a varying thickness. The varying thickness is provided by the insulation foil comprising a base layer and at least one thermally insulating foil layer with a varying thickness, which lies over said base layer. In the gas generator proposed, the insulation foil or the insulation foils is or are constructed having several layers. By means of the thermally insulating foil layer, it is achieved that the base layer lying under the foil layer, which is also a type of carrier layer, is heated more slowly and loses its strength more slowly. Thereby, the insulation foil in the region of its higher thickness is destroyed at least later than in the region of smaller thickness. A destruction of the insulation foil in the region of higher thickness, however, does not have to necessarily take place, it is even possible for the insulation foil not to be destroyed at all in this region at low ambient temperatures, whereby the associated outflow opening remains closed.

Although according to the preferred embodiment, provision is made that an insulation foil is used which covers several outflow openings or even all outflow openings and has a varying thickness in the corresponding regions for various outflow openings, it is also possible to use several insulation foils of differing thickness, in order to thereby achieve the above-mentioned purpose.

The thermally insulating foil layer can also be partially omitted, i.e. its thickness can be zero. In this region, the base layer is then very quickly exposed to the generated heat and is also destroyed more quickly than in the region with the thermally insulating foil layer.

In this connection, the term "thermally insulating" means that the foil layer has a distinctly lower thermal conductivity than the base layer. The thermally insulating layer is, in particular, a plastic layer, whereas the base layer is preferably of metal. The thermally insulating layer is to lie on that side of the insulation foil which faces the gas flow, in order to prevent a direct flow onto the base layer from this side.

Plastics have the characteristic that their strength decreases distinctly greater with increasing temperature in the range of −40° C. to 90° C., than is the case with metals. With an insulation of plastics, therefore, the static opening pressure will decrease in the temperature range of −40° C. to 90° C. On activation of the gas generator, this effect is further intensified, because the greater intensity of the combustion reaction at 90° C. heats the insulation foil more quickly than at −40° C. It is therefore highly efficient to coat the entire metallic base layer in order to lower the opening pressure of the insulation foil with increasing temperature. The effect becomes evident in FIG. 3b at the maximums of the combustion chamber pressures at room temperature (RT) and 85° C. The maximum at room temperature even lies over that of 85° C.

It would therefore be conceivable for the base layer to be embedded between two thermally insulating foil layers, in order to delay a heating from both sides.

For reasons of manufacturing technique, the base layer is preferably constructed so as to have a uniform thickness.

A simple manufacture of the insulation foil can be achieved in that the thermally insulating layer is simply sprayed onto the base layer.

As already indicated, the insulation foil in a preferred embodiment only partially has the thermally insulating foil layer, in order to cover at least one selected outflow opening with the additional thermally insulating layer, and to cover at least one selected outflow opening with only the base layer.

At least one insulation foil should be coordinated with the output of the gas generator such that the generated gas exposes all outflow openings at an ambient temperature of greater than 75° C., in particular for instance 85° C.

At low temperatures, i.e. at an ambient temperature of less than −25° C., in particular less than −30° C., not all the outflow openings are to be exposed, i.e. the insulation foil is not destroyed in these regions.

However, it can also be contemplated that even at low temperatures all the outflow openings or at least one outflow opening, which are closed by the thicker insulation foil, are opened. However, then it is possible by means of the insulation foil with a varying thickness, that a variable time delay can be set, until the associated outflow opening is opened. Here, the outflow opening or openings which are closed with a thicker insulation foil are to be exposed at an ambient temperature of less than −25° C. with a time delay, compared to the outflow opening with thin insulation foil, which is greater at least by the factor four than the time delay which exists at an ambient temperature of greater than 75° C.

BRIEF DESCRIPTION OF THE DRAWINGS

FIG. 1 shows a cross-sectional view through an embodiment of the gas generator according to the invention, FIG. 2 shows an insulation foil which is able to be used in the gas generator according to the invention.

DETAILED DESCRIPTION OF THE PREFERRED EMBODIMENTS

Figure 3A:
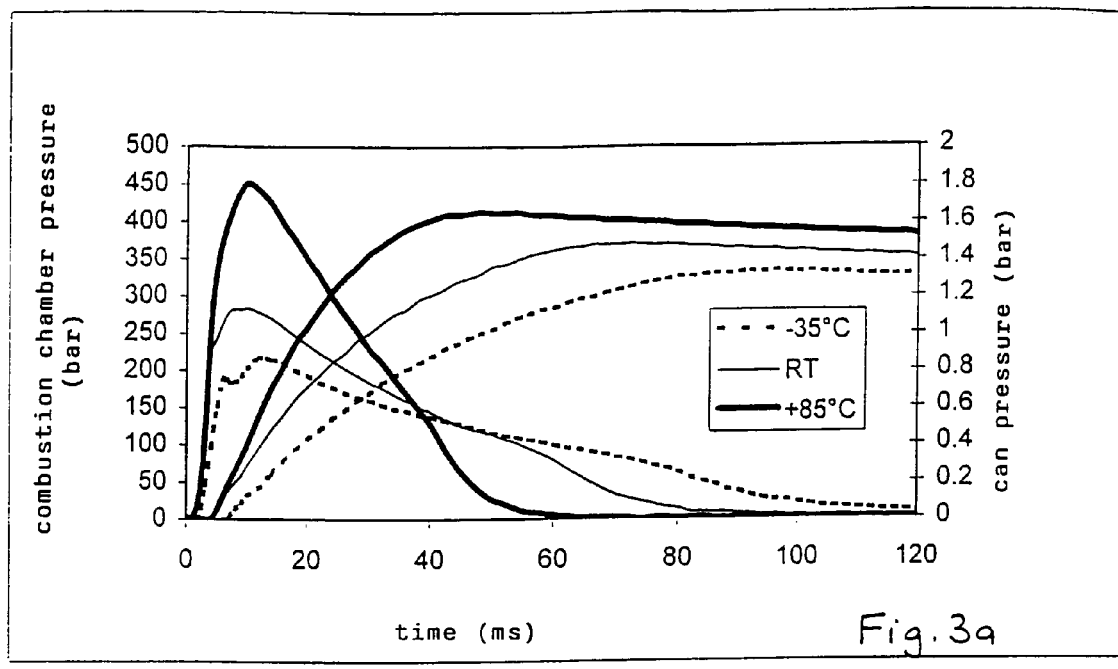
FIGS. 3a and 3b show the combustion chamber pressure profiles and can pressure profiles of a gas generator equipped with a conventional insulation foil (FIG. 3a) compared to the combustion chamber pressure profiles and can pressure profiles in the gas generator according to the invention (FIG. 3b)

In FIG. 1 a gas generator 10 is illustrated, which has a housing 12, the housing 12 having walls which define the outer housing and the inner housing. The gas generator has a combustion chamber 14 which is filled with solid propellant 16. The solid propellant 16 can be ignited by an igniter 18. A section of the housing 12 defines the combustion chamber 14; this section is named the combustion chamber wall 20. The combustion chamber wall 20 has on its periphery several uniformly distributed outflow openings 22, which preferably all have the same diameter. An insulation foil 24, which closes all the outflow openings 22, is glued onto the inner side of the combustion chamber wall.

The housing 12 has in addition an outer wall 26 which is likewise provided with outflow openings 28. On the inner side of the outer wall 26, an insulation foil 24 can likewise be provided, this insulation foil 24 being provided additionally or alternatively to the insulation foil 24 lying on the inner side of the combustion chamber wall 20. The insulation foil 24 prevents the entry of moisture into the combustion chamber 20.

In FIG. 2 the insulation foil 24 is illustrated in spread-out state. The insulation foil 24 consists of several layers, namely a base layer 32 of metal having a large area, and a thermally insulating foil layer 34 of plastic applied onto the base layer, which is applied onto the base layer 32 by spraying. As can be seen from FIG. 2, the foil layer 34 is, however, only partially applied onto the base layer 32. The illustrated holes symbolize the positions of the outflow openings 22 which are closed by the insulation foil 24. The base layer 32 and the foil layer 34 each have a uniform thickness across their extent, so that the entire insulation foil 24 has the greatest thickness in the region of the foil layer 34. The insulation foil 24 is fastened to the combustion chamber wall 20 such that the foil layer 34 directly faces the solid propellant 16.

After the igniting of the solid propellant 16, the latter is burned and hot gas is produced in the combustion chamber 14, which strikes directly onto the base layer 32 or, where present, onto the foil layer 34. The heat development combined with the pressure development provides for a local destruction of the insulation foil 24 in the region of the outflow openings 22.

The individual layers of the insulation foil 24 are constructed here such that at an ambient temperature of the gas generator (temperature of the gas generator before ignition) of greater than 75° C., in particular of approximately 85° C., all the outflow openings 22 are opened, i.e. also the foil layer 34 is destroyed.

At low ambient temperatures of less than −25° C., in particular less than −30° C., the foil layer 34 insulates the section of the base layer 32 lying under it, so that the insulation foil 24 in this region is either not destroyed at all and the associated outflow openings 22 thereby remain closed, or these outflow openings would be opened with a distinctly greater time delay compared to the outflow openings 22 covered only by the base layer 32 than is the case with an ambient temperature of greater than 75° C. The time delay here should be greater by at least the factor four than the time delay which occurs at the ambient temperature of greater than 75° C.

Figure 3B:
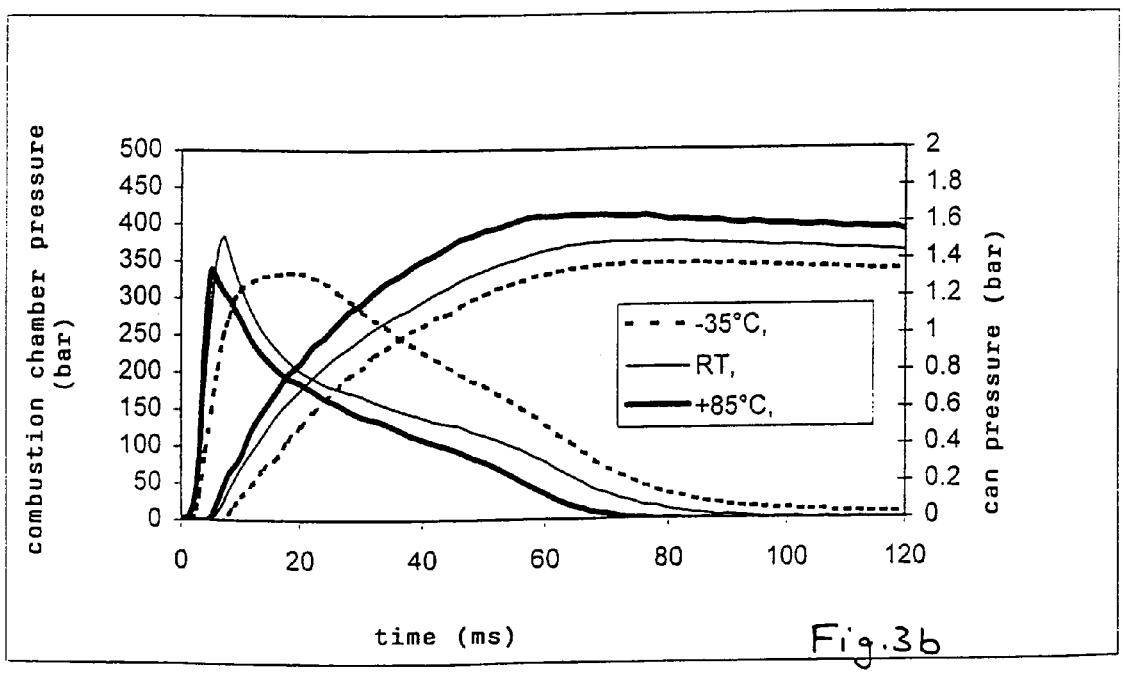
Figure 4:
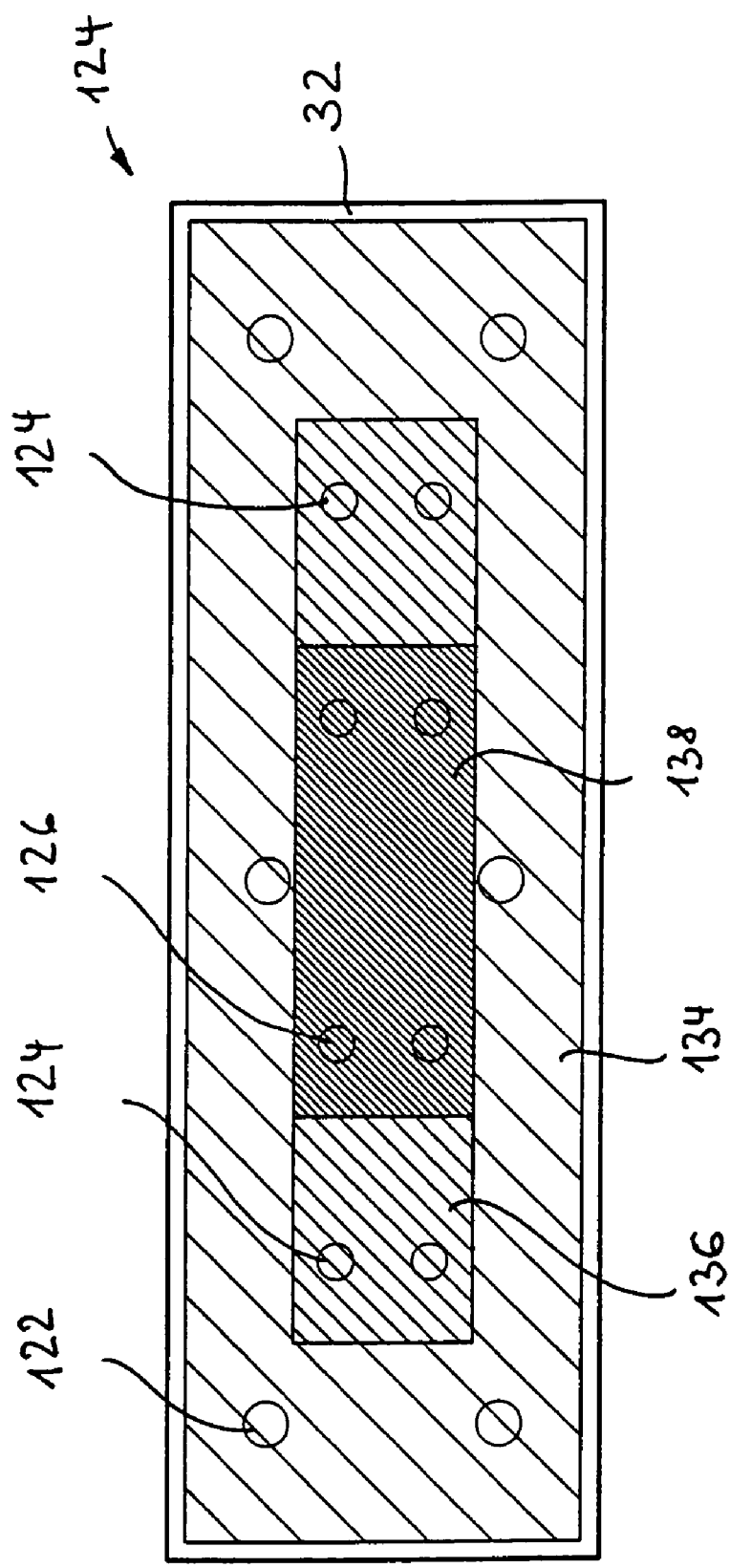
FIG. 4 shows a second embodiment of an insulation foil that can be used.

In FIG. 4, the construction of a second insulation foil 124 is shown, which has a metallic base layer 32 which in three regions has insulation foils of different thickness applied thereon. FIG. 3b shows the corresponding combustion chamber and can pressure curves with this coated insulation compared to a generator with uniformly thick metal foil as insulation (FIG. 3a).

The six larger openings 122 are covered with the thinnest foil layer section 134 and open in the entire temperature range of −40° C. to +90° C. At 85° C., in addition all the more intensively covered eight smaller openings 124 and 126 will open. At 23° C., only the four smaller openings 124 are opened, in the region 136 of which the foil layer has a medium thickness. The bores 126 in a region 138, in which the foil layer has the greatest thickness, remain closed at 23° C.

Through a corresponding graduation of the layer thickness of the foil layer over all the small openings 124, 126, also even a refinement of the opening behavior over the entire temperature range would be possible.

FIGS. 3a and 3b show a comparison of a gas generator with a uniformly thick metal foil as insulation (FIG. 4a) and with the use of the insulation according to FIG. 4. The combustion chamber pressure and also the so-called can pressure are illustrated. The can pressure is the pressure inside a metal container of standardized size, in which the gas generator is ignited in the laboratory, and with which the pressure inside a gas bag is simulated. With the aid of the comparison of FIGS. 3a and 3b, it becomes clear that in the gas generator according to the invention, the combustion chamber pressure profile depends less on the ambient temperature than in a conventional one. Furthermore, the can pressure also varies less over the temperature range than with a uniformly thick insulation foil. In order to keep the combustion chamber pressure at 85° C. as low as possible, the housing provided with the insulation foil according to the invention is to have a large outflow area which can be greater than in the gas generator, the pressure profile of which can be seen in FIG. 3a.

The invention claimed is:

1. A gas generator, comprising
a housing (12), which has outflow openings (22, 28) for outflowing gas, and
at least one destructible insulation foil (24) which in a non-activated state of said gas generator (10) closes at least one of said outflow openings (22) so as to be moisture-tight,
said insulation foil (24) having a varying thickness,
wherein said varying thickness is provided by said foil (24) comprising a base layer (32) and at least one thermally insulating foil layer (34) with a varying thickness, which has a distinctly lower thermal conductivity than said base layer (32) and lies over said base layer (32) on a side of said insulation foil (24) which faces a gas flow.

2. The gas generator according to claim 1, wherein said thermally insulating foil layer (34) is a plastic layer.

3. The gas generator according to claim 1, wherein said base layer (32) is made of metal.

4. The gas generator according to claim 1, wherein said base layer (32) has a uniform thickness.

5. The gas generator according to claim 1, wherein said thermally insulating foil layer (34) comprises a spray coating applied onto said base layer (32).

6. The gas generator according to claim 1, wherein said insulation foil (24) covers several outflow openings (22) and has regions with a varying thickness for various outflow openings (22).

7. The gas generator according to claim 1, wherein the thickness of said thermally insulating foil layer (34) is, in parts, zero.

8. The gas generator according to claim 1, wherein said base layer (32) has front and rear sides which are covered by said foil layer (34).

9. The gas generator according to claim 1, wherein said at least one insulation foil (24) is constructed such that, at an ambient temperature of greater than 75° C. all of said outflow openings (22) are opened by a generated gas.

10. The gas generator according to claim 9, wherein said at least one insulation foil (24) is constructed such that, at an ambient temperature of less than −25° C., one of said outflow openings (22) which is closed by a thicker insulation foil (24), compared to one of said outflow opening (22) which is closed by a thinner insulation foil (24), is opened with a time delay that is greater by at least a factor four than a time delay which exists at an ambient temperature of greater than 75° C.

11. The gas generator according to claim 1, wherein said at least one insulation foil (24) is constructed such that, at an ambient temperature of less than −25° C. not all of said outflow openings (22) are opened by a generated gas.

12. A gas generator, comprising a housing (12), which has outflow openings (22, 28) for outflowing gas, and at least one destructible insulation foil (24) which in a non-activated state of said gas generator (10) closes at least one of said outflow openings (22) so as to be moisture-tight, said insulation foil (24) having a varying thickness, wherein said varying thickness is provided by said foil (24) comprising a base layer (32) and at least one thermally insulating foil layer (34) with a varying thickness, which lies over said base layer (32), wherein said insulation foil (24) only partially has said thermally insulating foil layer (34), in order to cover at least one selected outflow opening (22) with said additionally thermally insulating foil layer (34), and to cover at least one selected outflow opening (22) with said base layer (32) and without said foil layer (34).

* * * * *